US012080455B2

(12) United States Patent
Ichigozaki et al.

(10) Patent No.: US 12,080,455 B2
(45) **Date of Patent: *Sep. 3, 2024**

(54) Sm—Fe—N-BASED MAGNETIC MATERIAL AND MANUFACTURING METHOD THEREOF

(71) Applicant: TOYOTA JIDOSHA KABUSHIKI KAISHA, Toyota (JP)

(72) Inventors: Daisuke Ichigozaki, Toyota (JP); Tetsuya Shoji, Susono (JP); Noritsugu Sakuma, Mishima (JP); Akihito Kinoshita, Mishima (JP); Masaaki Ito, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,944

(22) Filed: Sep. 15, 2021

(65) Prior Publication Data

US 2022/0093297 A1 Mar. 24, 2022

(30) Foreign Application Priority Data

Sep. 24, 2020 (JP) ................................ 2020-159860

(51) Int. Cl.
*H01F 1/059* (2006.01)
*C22C 38/00* (2006.01)
(Continued)

(52) U.S. Cl.
CPC ........... *H01F 1/059* (2013.01); *C22C 38/001* (2013.01); *C22C 38/005* (2013.01); (Continued)

(58) Field of Classification Search
CPC . C22C 2202/02; C22C 38/001; C22C 38/005; C22C 38/105; C23C 8/26; H01F 1/059; H01F 41/0253
(Continued)

(56) References Cited

U.S. PATENT DOCUMENTS 6,413,327 B1 * 7/2002 Okajima ................ H01F 1/059 148/301
2017/0186519 A1 6/2017 Maehara
(Continued)

FOREIGN PATENT DOCUMENTS

CN 110942879 A 3/2020
JP 2002217010 A * 8/2002 ............ H01F 1/059
(Continued)

OTHER PUBLICATIONS

NPL: on-line translation of JP2002217010, Aug. 2002 (Year: 2002).*
(Continued)

*Primary Examiner* — Jie Yang
(74) *Attorney, Agent, or Firm* — Sughrue Mion, PLLC

(57) ABSTRACT

An Sm—Fe—N-based magnetic material according to the present disclosure includes a main phase having a predetermined crystal structure. The main phase has a composition represented by $(Sm_{(1-x-y-z)}La_xCe_yR^1_z)_2(Fe_{(1-p-q-s)}Co_pNi_qM_s)_{17}N_h$ (where, $R^1$ is predetermined rare earth elements and the like, M is predetermined elements and the like, and $0.04 \leq x+y \leq 0.50$, $0 \leq z \leq 0.10$, $0 \leq p+q \leq 0.10$, $0 \leq s \leq 0.10$, and $2.9 \leq h \leq 3.1$ are satisfied). A crystal volume of the main phase is 0.833 nm$^3$ to 0.840 nm$^3$. A manufacturing method of the Sm—Fe—N-based magnetic material according to the present disclosure includes nitriding a magnetic material precursor including a crystal phase having a composition represented by $(Sm_{(1-x-y-z)}La_xCe_yR^1_z)_2(Fe_{(1-p-q-s)}Co_pNi_qM_s)_{17}$.

9 Claims, 2 Drawing Sheets

(51) Int. Cl.

| | |
|---|---|
| ***C22C 38/10*** | (2006.01) |
| ***C23C 8/26*** | (2006.01) |
| ***H01F 41/02*** | (2006.01) |

(52) U.S. Cl.
CPC .............. *C22C 38/105* (2013.01); *C23C 8/26* (2013.01); *H01F 41/0253* (2013.01); *C22C 2202/02* (2013.01)

(58) Field of Classification Search
USPC .............................................................. 420/83
See application file for complete search history.

(56) References Cited

U.S. PATENT DOCUMENTS

| | | | | |
|---|---|---|---|---|
| 2022/0001317 | A1 | 1/2022 | Zhao | |
| 2022/0093208 | A1* | 3/2022 | Lefkowitz .............. | G16B 20/20 |

FOREIGN PATENT DOCUMENTS

| | | | |
|---|---|---|---|
| JP | 2004-193207 | A | 7/2004 |
| JP | 2010-62326 | A | 3/2010 |
| JP | 2017-117937 | A | 6/2017 |
| JP | 2019-112716 | A | 7/2019 |

OTHER PUBLICATIONS

Non-Final Office Action dated Mar. 9, 2023 issued by the U.S. Patent and Trademark Office in U.S. Appl. No. 17/480,568.

Final Office Action issued in U.S. Appl. No. 17/480,568 on Jun. 28, 2023.

Notice of Allowance dated Nov. 8, 2023 in U.S. Appl. No. 17/480,568.

Advisory Action dated Oct. 19, 2023 in U.S. Appl. No. 17/480,568.

* cited by examiner

Sm—Fe—N-BASED MAGNETIC MATERIAL AND MANUFACTURING METHOD THEREOF

CROSS-REFERENCE TO RELATED APPLICATION

This application claims priority to Japanese Patent Application No. 2020-159860 filed on Sep. 24, 2020, incorporated herein by reference in its entirety.

BACKGROUND

1. Technical Field

The present disclosure relates to an Sm—Fe—N-based magnetic material and a manufacturing method thereof. The present disclosure particularly relates to an Sm—Fe—N-based magnetic material including a main phase having at least any one of $Th_2Zn_{17}$ type and $Th_2Ni_{17}$ type crystal structures and a manufacturing method thereof.

2. Description of Related Art

As a high-performance magnetic material, an Sm—Co-based magnetic material and an Nd—Fe—B-based magnetic material have been put into practical use, but in recent years, magnetic materials other than these materials have been studied. For example, the Sm—Fe—N-based magnetic material including the main phase having at least any one of the $Th_2Zn_{17}$ type and $Th_2Ni_{17}$ type crystal structures (hereinafter, may be simply referred to as "Sm—Fe—N-based magnetic material") has been studied.

The Sm—Fe—N-based magnetic material includes the main phase having at least any one of the $Th_2Zn_{17}$ type and $Th_2Ni_{17}$ type crystal structures. In this main phase, it is considered that nitrogen is introduced into an Sm—Fe-based crystal phase in an intrusion manner.

Japanese Unexamined Patent Application Publication No. 2017-117937 (JP 2017-117937 A) discloses a manufacturing method of an Sm—Fe—N-based magnetic material, in which an oxide containing Sm, Fe, La, and W is reduced, and the reduced product is nitrided to obtain an Sm—Fe—N-based magnetic material.

SUMMARY

A magnetic characteristic of the Sm—Fe—N-based magnetic material, particularly saturation magnetization, is achieved by selecting Sm as a rare earth element. As the Sm—Fe—N-based magnetic material becomes widespread, it is expected that the price of Sm that is a main element of the Sm—Fe—N-based magnetic material will rise suddenly. From the above, the present inventors have found that the Sm—Fe—N-based magnetic material and the manufacturing method thereof are desired, in which even when a usage amount of Sm is reduced, the saturation magnetization is improved or a decrease in the saturation magnetization is suppressed within a range in which there is no problem in practical use.

The present disclosure has been made to solve the above problems. That is, the present disclosure is to provide the Sm—Fe—N-based magnetic material and the manufacturing method thereof, in which even when a usage amount of Sm is reduced, the saturation magnetization is improved or the decrease in the saturation magnetization is suppressed within a range in which there is no problem in practical use. Note that in the present specification, unless otherwise noted, the "saturation magnetization" means saturation magnetization at room temperature.

The present inventors have made extensive studies and completed an Sm—Fe—N-based magnetic material and a manufacturing method thereof according to the present disclosure. The Sm—Fe—N-based magnetic material and a manufacturing method thereof according to the present disclosure include the following aspects.

<1> An Sm—Fe—N-based magnetic material including a main phase having at least any one of $Th_2Zn_{17}$ type and $Th_2Ni_{17}$ type crystal structures, in which the main phase has a composition represented by a molar ratio formula $(Sm_{(1-x-y-z)}La_xCe_yR^1_z)_2(Fe_{(1-p-q-s)}Co_pNi_qM_s)_{17}N_h$ (where, $R^1$ is one or more rare earth elements other than Sm, La, and Ce, and Zr, M is one or more elements other than Fe, Co, Ni, and a rare earth element, and an unavoidable impurity element, and $0.04 \leq x+y \leq 0.50$, $0 \leq z \leq 0.10$, $0 \leq p+q \leq 0.10$, $0 \leq s \leq 0.10$, and $2.9 \leq h \leq 3.1$ are satisfied), and a crystal volume of the main phase is 0.833 $nm^3$ to 0.840 $nm^3$.

<2> The Sm—Fe—N-based magnetic material according to <1>, in which a volume fraction of the main phase is 95% to 100%.

<3> The Sm—Fe—N-based magnetic material according to <1> or <2>, in which a density of the main phase is 7.30 $g/cm^3$ to 7.70 $g/cm^3$.

<4> The Sm—Fe—N-based magnetic material according to <1> or <2>, in which a density of the main phase is 7.40 $g/cm^3$ to 7.60 $g/cm^3$.

<5> A manufacturing method of the Sm—Fe—N-based magnetic material according to <1>, the method including preparing a magnetic material precursor including a crystal phase having a composition represented by a molar ratio formula $(Sm_{(1-x-y-y)}La_xCe_yR^1_z)_2(Fe_{(1-p-q-s)}Co_pNi_qM_s)_{17}$ (where, $R^1$ is one or more rare earth elements other than Sm, La, and Ce, and Zr, M is one or more elements other than Fe, Co, Ni, and a rare earth element, and an unavoidable impurity element, and $0.04 \leq x+y \leq 0.50$, $0 \leq z \leq 0.10$, $0 \leq p+q \leq 0.10$, and $0 \leq s \leq 0.10$ are satisfied), and nitriding the magnetic material precursor.

<6> The method according to <5>, in which a volume fraction of the crystal phase is 95% to 100%.

<7> The method according to <5> or <6>, in which the magnetic material precursor is pulverized to obtain magnetic material precursor powder, and then the magnetic material precursor powder is nitrided.

<8> The method according to any one of <5> to <7>, in which a raw material containing the elements constituting the magnetic material precursor is melted and solidified to obtain the magnetic material precursor.

According to the present disclosure, it is possible to provide the Sm—Fe—N-based magnetic material in which even when a part of Sm is substituted with La and/or Ce in order to reduce the usage amount of Sm, by setting the lattice volume of the main phase within a predetermined range, the saturation magnetization is improved or the decrease in the saturation magnetization is suppressed within a range in which there is no problem in practical use.

Further, according to the present disclosure, it is possible to provide the manufacturing method of the Sm—Fe—N-based magnetic material in which even when the usage amount of Sm is reduced, by nitriding the magnetic material precursor obtained by substituting a part of Sm with La and/or Ce and setting the lattice volume of the main phase within a predetermined range, the saturation magnetization can be improved or the decrease in the saturation magnetization can be suppressed within a range in which there is no problem in practical use.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
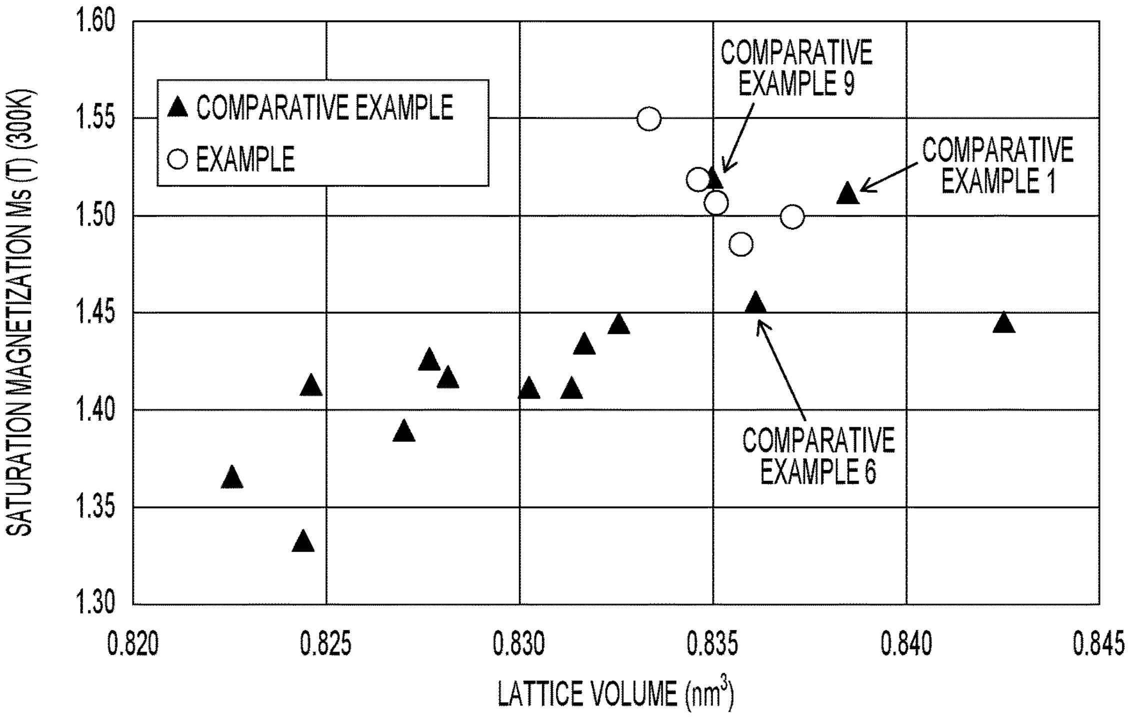
FIG. 1 is a graph showing a relationship between a lattice volume and saturation magnetization Ms (300 K)

Hereinafter, embodiments of an Sm—Fe—N-based magnetic material and a manufacturing method thereof according to the present disclosure will be described in detail. Note that the embodiments shown below do not limit the Sm—Fe—N-based magnetic material according to the present disclosure and the manufacturing method thereof.

Although not restricted by theory, the reason why the Sm—Fe—N-based magnetic material and the manufacturing method thereof in which even when a usage amount of Sm is reduced, the saturation magnetization is improved or a decrease in the saturation magnetization is suppressed within a range in which there is no problem in practical use can be provided will be described below.

As described above, the Sm—Fe—N-based magnetic material according to the present disclosure includes a main phase having at least any one of $Th_2Zn_{17}$ type and $Th_2Ni_{17}$ type crystal structures. The main phase in the Sm—Fe—N-based magnetic material according to the present disclosure is nitrided to express magnetism. In a case where the main phase having at least any one of the $Th_2Zn_{17}$ type and $Th_2Ni_{17}$ type crystal structures is constituted of Sm, Fe, and N, the most representative main phase composition is represented by $Sm_2Fe_{17}N_3$. Hereinafter, a phase having such a composition may be referred to as an "$Sm_2Fe_{17}N_3$ phase".

The $Sm_2Fe_{17}N_3$ phase is obtained by nitriding an $Sm_2Fe_{17}$ phase, and the $Sm_2Fe_{17}N_3$ phase has a crystal structure in which nitrogen (N) is introduced into the $Sm_2Fe_{17}$ phase in an intrusion manner. A lattice volume of the $Sm_2Fe_{17}N_3$ phase is about 0.838 $nm^3$.

When a part of Sm in the $Sm_2Fe_{17}N_3$ phase is substituted with La and/or Ce cheaper than Sm in order to reduce a usage amount of Sm, the lattice volume of the main phase is changed. Then, a magnetic characteristic, particularly the saturation magnetization, is changed due to the change in the lattice volume of the main phase.

Since an ionic radius of La is greatly large as compared with an ionic radius of Sm, when a part of Sm is substituted with La, the lattice volume of the main phase is basically increased. Where, in a case where an amount of substitution with La is small due to variations in a degree of intrusion of nitrogen (N) introduced into the main phase in the intrusion manner during nitriding, the lattice volume of the main phase may be decreased. Since an ionic radius of Ce is slightly large as compared with the ionic radius of Sm, when a part of Sm is substituted with Ce, the lattice volume of the main phase is basically increased. Where, due to Ce ions that can have trivalent and tetravalent values, and the variations in the degree of intrusion of nitrogen (N) introduced into the main phase in the intrusion manner during nitriding, when a part of Sm is substituted with Ce, the lattice volume of the main phase may be increased or decreased.

When a part of Sm is substituted with cheap La and/or Ce, the lattice volume of the main phase is basically increased. In this case, when a part of Fe is optionally substituted with Co and/or Ni having an ionic radius smaller than that of Fe, an increase in the lattice volume can be suppressed.

As described above, by substituting a part of Sm with La and/or Ce and optionally substituting a part of Fe with Co and/or Ni, the lattice volume of the main phase in the Sm—Fe—N-based magnetic material can be changed. Then, by setting the lattice volume of the main phase in the Sm—Fe—N-based magnetic material within a predetermined range, the saturation magnetization of the Sm—Fe—N-based magnetic material can be improved or the decrease in the saturation magnetization can be suppressed within a range in which there is no problem in practical use.

The constituent elements of the Sm—Fe—N-based magnetic material and the manufacturing method thereof according to the present disclosure that have been completed based on the description and the like so far will be described below.

Sm—Fe—N-Based Magnetic Material

The Sm—Fe—N-based magnetic material according to the present disclosure includes the main phase having at least any one of the $Th_2Zn_{17}$ type and $Th_2Ni_{17}$ type crystal structures. The Sm—Fe—N-based magnetic material according to the present disclosure expresses the magnetism due to the main phase thereof. The main phase will be described below.

Crystal Structure of Main Phase

The main phase has at least any one of the $Th_2Zn_{17}$ type and $Th_2Ni_{17}$ type crystal structures. The crystal structure of the main phase may have a $TbCu_7$ type crystal structure or the like in addition to the structure described above. Note that Th is thorium, Zn is zinc, Ni is nickel, Tb is terbium, and Cu is copper. The crystal structure of the main phase can be identified by performing, for example, an X-ray diffraction analysis or the like with respect to the Sm—Fe—N-based magnetic material.

The phase having the crystal structure described above can be achieved by a combination (composition) of various elements, but the main phase in the Sm—Fe—N-based magnetic material according to the present disclosure is achieved by a combination (composition) of the following elements. Hereinafter, the composition of the main phase in the Sm—Fe—N-based magnetic material according to the present disclosure will be described.

Composition of Main Phase

The main phase has a composition represented by a molar ratio formula $(Sm_{(1-x-y-z)}La_xCe_yR^1_z)_2(Fe_{(1-p-q-s)}Co_pNi_qM_s)_{17}N_h$. In the composition formula described above, Sm is samarium, La is lanthanum, Ce is cerium, Fe is iron, Co is cobalt, and Ni is nickel. $R^1$ is one or more rare earth elements other than Sm, La, and Ce, and Zr. M is one or more elements other than Fe, Co, Ni, and a rare earth element, and an unavoidable impurity element. Note that Zr is zirconium. Further, in the formula described above, for convenience of description, $Sm_{(1-x-y)}La_xCe_yR^1_z$ may be referred to as a rare earth site, $Fe_{(1-p-q-s)}Co_pNi_qM_s$ may be referred to as an iron group site.

As can be understood from the above formula, the main phase contains 2 mol of one or more elements in the rare earth site, 17 mol of one or more elements in the iron group site, and h mol of nitrogen (N). That is, one or more elements in the rare earth site and one or more elements in the iron group site constitute the phase having the crystal structure described above, and h mol of nitrogen (N) is introduced into the phase in the intrusion manner. When an introduction amount of nitrogen (N) is h mol (where, h is 2.9 to 3.1), the crystal structure described above can be maintained. Details of nitrogen (N) in the main phase will be described below.

The rare earth site consists of Sm, La, Ce, and R', and each of Sm, La, Ce, and $R^1$ is present in a ratio of (1−x−y−z):x:y:z in terms of a molar ratio. An expression (1−x−y−z)+x+y+z=1 means that a part of Sm is substituted with one or more elements selected from the group consisting of La, Ce, and $R^1$.

The iron group site consists of Fe, Co, Ni, and M, and each of Fe, Co, Ni, and M is present in a ratio of (1−p−q−s):p:q:s in terms of the molar ratio. An expression (1−p−q−s)+p+q+s=1 means that a part of Fe is substituted with one or more elements selected from the group consisting of Co, Ni, and M.

Hereinafter, each element constituting the expressions described above and a content ratio (molar ratio) thereof will be described.

Sm

Sm is a main element constituting the crystal structure described above together with Fe and N. A part of Sm is substituted with one or more elements selected from the group consisting of La, Ce, and $R^1$. Hereinafter, La, Ce, and $R^1$ will be described.

La

La belongs to a so-called light rare earth element, has a large reserve (resource amount) as compared with Sm, and is cheap. Since the ionic radius of La is greatly larger than the ionic radius of Sm, when a part of Sm is substituted with La, the lattice volume of the main phase is basically increased. Where, in a case where an amount of substitution with La is small due to variations in a degree of intrusion of nitrogen (N) introduced into the main phase in the intrusion manner during nitriding, the lattice volume of the main phase may be decreased.

As described above, the ionic radius of La is greatly larger than the ionic radius of Sm. Therefore, when a part of Sm is substituted with La, the influence on the change in the lattice volume of the main phase is large. When the lattice volume of the main phase exceeds a predetermined range, the crystal structure described above cannot be maintained, or even when the crystal structure described above can be maintained, the magnetic characteristic, particularly the saturation magnetization, is deteriorated. In order to prevent above problems, it is requested not to excessively increase a rate of substitution with La when a part of Sm is substituted with La. However, as a result, it is difficult to increase a reduction amount of Sm. From the above, to use Ce that has a small influence on the change in the lattice volume of the main phase as compared with La is effective. Hereinafter, Ce will be described.

Ce

Ce belongs to a so-called light rare earth element, has a large reserve (resource amount) as compared with Sm, and is cheap. Since the ionic radius of Ce is slightly larger than the ionic radius of Sm, when a part of Sm is substituted with Ce, the lattice volume of the main phase is basically increased. Where, due to the Ce ions that can have trivalent and tetravalent values, the variations in the degree of intrusion of nitrogen (N) introduced into the main phase in the intrusion manner during nitriding, and the like, when a part of Sm is substituted with Ce, the lattice volume of the main phase may be increased or decreased.

As described above, the ionic radius of Ce is slightly larger than the ionic radius of Sm. Therefore, even when a part of Sm is substituted with Ce, the influence on the change in the lattice volume of the main phase is small. In order to maintain the crystal structure described above and obtain a desired magnetic characteristic, particularly the saturation magnetization, the lattice volume of the main phase is requested to be within a predetermined range. Since Ce has a small influence on the change in the lattice volume of the main phase, when a part of Sm is substituted with Ce, a rate of substitution with Ce is relatively high. As a result, the reduction amount of Sm can be relatively easily increased. Further, as described above, La has a large influence on the change in the lattice volume of the main phase and is likely to excessively decrease the lattice volume of the main phase. Therefore, when a part of Sm is substituted with La, it is difficult to increase the rate of substitution with La. From the above, the reduction amount of Sm can be increased by substituting a part of Sm with both La and Ce.

$R^1$ $R^1$ is one or more rare earth elements other than Sm, La, and Ce, and Zr. $R^1$ is one or more elements that are allowed to be contained within a range in which the magnetic characteristic of the Sm—Fe—N-based magnetic material according to the present disclosure is not impaired. $R^1$ is typically one or more rare earth elements other than Sm, La, and Ce that are difficult to completely separate from each of Sm, La, and Ce and remain in a small amount in a raw material when the raw material containing each of Sm, La, and Ce is purified. In addition to such rare earth elements, $R^1$ may contain Zr. Zr is not a rare earth element, but a part of Sm may be substituted with Zr. Even when a part of Sm is substituted with Zr, when the amount of substitution thereof is small, the magnetic characteristic of the Sm—Fe—N-based magnetic material is not significantly impaired.

In the present specification, the rare earth elements include 17 elements of scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and ruthenium (Lu).

Fe

Fe is a main element constituting the crystal structure described above together with Sm and N. A part of Fe may be substituted with one or more elements selected from the group consisting of Co, Ni, and M. Hereinafter, Co, Ni, and M will be described.

Co

Since Co belongs to a so-called iron group element, a part of Fe may be substituted with Co. An ionic radius of Co is smaller than an ionic radius of Fe. When a part of Sm is substituted with La and/or Ce, the lattice volume of the main phase is basically increased. Therefore, an excessive increase in the lattice volume of the main phase can be suppressed by substituting a part of Fe with Co.

Substituting a part of Fe with Co is convenient in that a Curie temperature of the main phase rises, and a decrease in the saturation magnetization at a high temperature (403 K to 473 K) can be suppressed.

Ni

Since Ni belongs to a so-called iron group element, a part of Fe may be substituted with Ni. An ionic radius of Ni is smaller than the ionic radius of Fe. When a part of Sm is substituted with La and/or Ce, the lattice volume of the main phase is basically increased. Therefore, an excessive increase in the lattice volume of the main phase can be suppressed by substituting a part of Fe with Ni.

When a part of Fe is substituted with Ni, there is a concern that the magnetic characteristic may be deteriorated. However, since the ionic radius of Ni is smaller than the ionic radius of Co, as compared with a case where a part of Fe is substituted with Co, in a case where a part of Fe is substituted with Ni, the lattice volume of the main phase is significantly decreased even when the rate of substitution with Ni is not so increased. From the above, for example, when a part of Sm is substituted with a large amount of La and/or Ce and the lattice volume of the main phase is excessively increased, the lattice volume of the main phase can be set within a predetermined range by using a relatively small amount of Ni. As a result, the contribution to the improvement of the magnetic characteristic, particularly the saturation magnetization, by setting the lattice volume of the main phase within the predetermined range can be larger than the deterioration of the magnetic characteristic by substituting a part of Fe with Ni, and thus the reduction amount of Sm can be increased by substitution with a large amount of La and/or Ce.

M

M is one or more elements other than Fe, Co, Ni, and a rare earth element, and an unavoidable impurity element. M is one or more elements and the unavoidable impurity element that are allowed to be contained within the range in which the magnetic characteristic of the Sm—Fe—N-based magnetic material according to the present disclosure is not impaired. The unavoidable impurity element refers to an impurity element in which avoiding inclusion is unavoidable when the Sm—Fe—N-based magnetic material according to the present disclosure is manufactured, or causes a significant increase in the manufacturing cost to avoid its inclusion. Examples of such unavoidable impurity element include an impurity element in raw material, or an element, such as copper (Cu), zinc (Zn), gallium (Ga), aluminum (Al), boron (B), and the like, in which for example, when a bond molded body is formed, elements in a bond diffuse and/or intrude on a surface of the main phase. In addition, examples thereof include an element contained in a lubricant or the like used during molding, the element diffusing and/or intruding on the surface of the main phase. Note that the bond molded body will be described below.

Examples of M excluding the unavoidable impurity element include one or more elements selected from the group consisting of titanium (Ti), chromium (Cr), manganese (Mn), vanadium (V), molybdenum (Mo), tungsten (W), and carbon (C). These elements, for example, form a nuclear material during the generation of the main phase and contribute to promotion of miniaturization of the main phase and/or the suppression of grain growth of the main phase.

Further, Zr can be contained as M. As described above, Zr is not a rare earth element, but a part of Sm may be substituted with Zr, while a part of Fe may be substituted with Zr. In any case, when the amount of substitution thereof is small, the magnetic characteristic of the Sm—Fe—N-based magnetic material is not significantly impaired.

N

N is introduced into the main phase having the crystal structure described above in the intrusion manner. When N is introduced into such an extent that N does not break the phase having the crystal structure described above, a magnetic moment is expressed in the main phase.

When the main phase in the Sm—Fe—N-based magnetic material according to the present disclosure is constituted of the elements described so far and the lattice volume of the main phase is within the predetermined range, the Sm—Fe—N-based magnetic material according to the present disclosure has the desired saturation magnetization even when the usage amount of Sm is reduced. Hereinafter, the lattice volume of the main phase will be described.

Lattice Volume

The lattice volume of the main phase in the Sm—Fe—N-based magnetic material according to the present disclosure is within a range of 0.833 $nm^3$ to 0.840 $nm^3$. When the lattice volume of the main phase is within the range described above, the desired saturation magnetization is obtained, that is, the saturation magnetization can be improved or the decrease in the saturation magnetization can be suppressed within a range in which there is no problem in practical use as compared with a case where the main phase is the $Sm_2Fe_{17}N_3$ phase.

Although not restricted by theory, it is considered that the reason why the desired saturation magnetization is obtained when the lattice volume of the main phase is within the range described above is as follows.

As described above, the saturation magnetization of the Sm—Fe—N-based magnetic material is derived from the fact that the magnetic moment is expressed in the main phase by introducing N into the main phase in the intrusion manner. From the above, the saturation magnetization is greatly affected by a distance between Fe and N in a lattice of the main phase (hereinafter, may be simply referred to as "distance between Fe and N"). Fe and N are three-dimensionally arranged in the lattice of the main phase, and thus the lattice volume of the main phase is convenient for grasping the distance between Fe and N.

In the Sm—Fe—N-based magnetic material according to the present disclosure, a part of Sm is substituted with La and/or Ce, and a part of Fe is optionally substituted with Co and/or Ni. As a result, the lattice volume of the $Sm_2Fe_{17}N_3$ phase is changed. In this case, it is considered that the distance between Fe and N in the lattice of the main phase is preferably set close to the distance between Fe and N in the lattice of the $Sm_2Fe_{17}N_3$ phase. Since the lattice volume of the $Sm_2Fe_{17}N_3$ phase is about 0.838 $nm^3$, it is considered that the lattice volume of the main phase in the Sm—Fe—N-based magnetic material according to the present disclosure is preferably set close to 0.838 $nm^3$. From this view point, the lattice volume of the main phase in the Sm—Fe—N-based magnetic material according to the present disclosure may be 0.833 $nm^3$ or more, 0.834 $nm^3$ or more, 0.835 $nm^3$ or more, 0.836 $nm^3$ or more, or 0.837 $nm^3$ or more, and may be 0.840 $nm^3$ or less, 0.839 $nm^3$ or less, or 0.838 $nm^3$ or less.

The lattice volume of the main phase can be obtained by the following points. The X-ray diffraction analysis is performed with respect to the Sm—Fe—N-based magnetic material, and an a-axis length and a c-axis length are obtained from an X-ray diffraction pattern based on a relationship between a plane index and a lattice plane spacing value (d value). When the a-axis length and the c-axis length are obtained, since the main phase in the Sm—Fe—N-based magnetic material according to the present disclosure has the crystal structure described above, the main phase may be assumed to be a rhombohedral crystal. Therefore, as the plane index, a (202) plane, a (113) plane, a (104) plane, a (211) plane, a (122) plane, and a (300) plane can be used. Then, the lattice volume is calculated according to the following expression.

$$(\text{Lattice volume})=\{(a\text{-axis length})/2\}^2\times 6\times 3^{0.5}\times\{(c\text{-axis length})/3\}$$

In the Sm—Fe—N-based magnetic material according to the present disclosure, a part of Sm is substituted with La and/or Ce such that the lattice volume of the main phase is within the range described above, and a part of Fe is optionally substituted with Co and/or Ni. Regarding above, description will be made below by using the formula $(Sm_{(1-x-y-z)}La_xCe_yR^1_z)_2(Fe_{(1-p-q-s)}Co_pNi_qM_s)_{17}N_h$ that represents the composition of the main phase in terms of the molar ratio.

x+y

In the above formula that represents the composition of the main phase, a value of x indicates a ratio (molar ratio) in which a part of Sm is substituted with La, and a value of y indicates a ratio (molar ratio) in which a part of Sm is substituted with Ce.

When a value of x+y is 0.04 or more, the improvement in economic efficiency due to the substitution of a part of Sm with cheap La and/or Ce is substantially recognized. Also, when the value of x+y is 0.04 or more, a change in the lattice volume of the main phase due to the substitution of a part of Sm with La and/or Ce is significantly recognized. From these viewpoints, the value of x+y may be 0.06 or more, 0.08 or more, or 0.10 or more. On the other hand, when the value of x+y is 0.50 or less, the lattice volume of the main phase is not excessively increased, including the fact that a part of Fe is substituted with Co and/or Ni. From this viewpoint, the value of x+y may be 0.46 or less, 0.44 or less, 0.40 or less, 0.36 or less, 0.34 or less, 0.30 or less, or 0.29 or less.

Further, while the value of x+y satisfies the range described above, the value of x is 0 or more, 0.02 or more, 0.04 or more, 0.06 or more, 0.08 or more, 0.09 or more, or 0.10 or more, and may be 0.50 or less, 0.45 or less, 0.40 or less, 0.35 or less, 0.30 or less, 0.28 or less, 0.26 or less, 0.24 or less, 0.22 or less, 0.20 or less, 0.18 or less, 0.16 or less, 0.14 or less, 0.12 or less, or 0.11 or less. Similarly, while the value of x+y satisfies the range described above, the value of y is 0 or more, 0.02 or more, 0.04 or more, 0.06 or more, 0.08 or more, 0.09 or more, or 0.10 or more, and may be 0.50 or less, 0.45 or less, 0.40 or less, 0.35 or less, 0.30 or less, 0.28 or less, 0.26 or less, 0.24 or less, 0.22 or less, 0.20 or less, 0.19 or less, 0.18 or less, 0.16 or less, 0.14 or less, 0.12 or less, or 0.10 or less.

z

In the above formula that represents the composition of the main phase, z indicates a ratio (molar ratio) in which a part of Sm is substituted with $R^1$. As described above, $R^1$ is one or more rare earth elements and Zr that are allowed to be contained within the range in which the magnetic characteristic of the Sm—Fe—N-based magnetic material according to the present disclosure is not impaired. From the above, z may be 0.10 or less, 0.08 or less, 0.06 or less, 0.04 or less, or 0.02 or less. On the other hand, the Sm—Fe—N-based magnetic material according to the present disclosure may not contain $R^1$ at all, that is, z may be 0, but it is difficult to prevent $R^1$ from being contained in the raw material at all when the Sm—Fe—N-based magnetic material according to the present disclosure is manufactured. From this viewpoint, z may be 0.01 or more.

p+q

In the above formula that represents the composition of the main phase, a value of p indicates a ratio (molar ratio) in which a part of Fe is substituted with Co, and a value of q indicates a ratio (molar ratio) in which a part of Fe is substituted with Ni.

As described above, when a part of Sm is substituted with La and/or Ce, the lattice volume of the main phase is basically increased. When a part of Sm is substituted with La and/or Ce and the lattice volume of the main phase is increased, a part of Fe may be optionally substituted with Co and/or Ni to suppress an increase in the lattice volume of the main phase.

In a case where a part of Sm is substituted with a small amount of La and/or Ce, even when a part of Fe is not substituted with Co and/or Ni, that is, a value of p+q is 0, the lattice volume of the main phase can be within the range described above.

However, even when a part of Sm is substituted with a small amount of La and/or Ce, a part of Fe may be substituted with Co and/or Ni to decrease the lattice volume of the main phase within the range described above. Further, when a part of Sm is substituted with a large amount of La and/or Ce and the crystal volume of the main phase is excessively increased, a part of Fe may be substituted with Co and/or Ni to decrease the lattice volume of the main phase such that the lattice volume of the main phase is within the range described above. In any case, when the value of p+q is 0.01 or more, a decrease in the crystal volume of the main phase can be substantially recognized. From this viewpoint, the value of p+q may be 0.02 or more, 0.03 or more, 0.04 or more, or 0.05 or more. On the other hand, Co and Ni are more expensive than Fe, but when the value of p+q is 0.10 or less, the improvement in economic efficiency due to the substitution of a part of Sm with cheap La and/or Ce is not offset. From this viewpoint, the value of p+q may be 0.09 or less, 0.08 or less, 0.07 or less, or 0.06 or less.

Further, while the value of p+q satisfies the range described above, the value of p may be 0 or more, 0.01 or more, 0.02 or more, 0.03 or more, 0.04 or more, or 0.05 or more, and may be 0.10 or less, 0.09 or less, 0.08 or less, 0.07 or less, or 0.06 or less. Similarly, while the value of p+q satisfies the range described above, the value of q may be 0 or more, 0.01 or more, 0.02 or more, 0.03 or more, 0.04 or more, or 0.05 or more, and may be 0.10 or less, 0.09 or less, 0.08 or less, 0.07 or less, or 0.06 or less.

s

In the above formula that represents the composition of the main phase, s indicates a ratio (molar ratio) in which a part of Fe is substituted with M. As described above, M is one or more elements and the unavoidable impurity element that are allowed to be contained within the range in which the magnetic characteristic of the Sm—Fe—N-based magnetic material according to the present disclosure is not impaired. From the above, s may be 0.10 or less, 0.08 or less, 0.06 or less, 0.04 or less, or 0.02 or less. On the other hand, the Sm—Fe—N-based magnetic material according to the present disclosure may not contain M at all, that is, s may be 0, but it is difficult to prevent the unavoidable impurity element in M from being contained at all. From this viewpoint, s may be 0.01 or more.

Relationship between x, y, z, p, q, and s x, y, z, p, q, and s satisfy the conditions for x, y, z, p, q, and s described so far, respectively, and are appropriately decided such that the lattice volume of the main phase is within the range described above. In this case, it is preferable that x, y, p, and q satisfy a relationship of Formula (1) below.

$$833 \le 16.267x + 3.927y - 26.279p - 56.5327q + 836 \le 840 \qquad \text{Formula (1)}$$

The reason why it is preferable that x, y, p, and q satisfy Formula (1) will be described below.

In Formula (1), a relational expression represented by "16.267x+3.927y−26.279p−56.5327q+836" enclosed by inequality signs represents the lattice volume of the main phase by x, y, p, and q. This relational expression represents a result of calculating, for the $Sm_2Fe_{17}N_3$ phase, the lattice volume of the main phase when a part of Sm is substituted with La and/or Ce and a part of Fe is substituted with Co and/or Ni by using machine learning. Hereinafter, in Formula (1), "16.267x+3.927y−26.279p−56.5327q+836" enclosed by inequality signs may be referred to as a "relational expression that represents the lattice volume of the main phase".

Then, Formula (1) means that the "relational expression that represents the lattice volume of the main phase" is within a range of 833 cubic angstrom to 840 cubic angstrom (0.833 $nm^3$ to 0.840 $nm^3$). As described above, the lattice volume of the main phase in the Sm—Fe—N-based magnetic material according to the present disclosure is within the range of 0.833 $nm^3$ to 0.840 $nm^3$. From the above, it means that it is preferable that in the composition of the main phase in the Sm—Fe—N-based magnetic material according to the present disclosure, s, y, p, and q satisfy Formula (1).

The reason why z regarding $R^1$ and s regarding M are not contained in the "relational expression that represents the lattice volume of the main phase" is as follows.

$R^1$ and M are one or more elements that are allowed to be contained within the range in which the magnetic characteristic of the Sm—Fe—N-based magnetic material according to the present disclosure is not impaired. Since the magnetic characteristic and the lattice volume of the main phase have close relationship, the influence on the lattice volume of the main phase is small as long as z and s are within the range in which the magnetic characteristic of the Sm—Fe—N-based magnetic material according to the present disclosure is not impaired, and the necessity of considering z and s is low. Therefore, z and s are not taken into consideration in the "relational expression that represents the lattice volume of the main phase".

As described above, the "relational expression that represents the lattice volume of the main phase" is acquired by machine learning, but the relational expression shows the following technical significance and is considered to be highly reliable.

First, a case of x=y=p=q=0 means a case where a part of Sm is not substituted with La and/or Ce and a part of Fe is not substituted with Co and/or Ni. That is, the case of x=y=p=q=0 means that the lattice volume of the $Sm_2Fe_{17}N_3$ phase is 836 cubic angstrom (0.836 $nm^3$). Since it is known that an actual lattice volume of $Sm_2Fe_{17}N_3$ phase is about 0.838 $nm^3$, it can be understood that a value of the lattice volume of $Sm_2Fe_{17}N_3$ phase in the "relational expression that represents the lattice volume of the main phase" is greatly close to the actual value.

A ratio of the coefficients of x and y (16.267:3.927) is close to a ratio of the ionic radius of La and the ionic radius of Ce. A ratio of absolute values of the coefficients of p and q (26.279:56.5327) is close to a ratio of the ionic radius of Co and the ionic radius of Ni.

Then, each of the coefficients described above indicates magnitude of the influence on the change in the lattice volume of the main phase when a part of Sm is substituted with La and/or Ce, or a part of Fe is substituted with Co and/or Ni.

The fact that the coefficients of x and y are positive indicates that when a part of Sm is substituted with La and/or Ce, the lattice volume of the main phase is basically increased. The fact that the coefficient of x is larger than the coefficient of y indicates that since the ionic radius of La is larger than the ionic radius of Ce, the substitution of a part of Sm with La has large influence on the change in the lattice volume of the main phase as compared with the substitution of a part of Sm with Ce.

The fact that the coefficients of p and q are negative indicates that when a part of Fe is substituted with Co and/or Ni, the lattice volume of the main phase is basically decreased. The fact that the absolute value of the coefficient of p is larger than the absolute value of the coefficient of q indicates that since the ionic radius of Ni is larger than the ionic radius of Co, the substitution of a part of Fe with Co has large influence on the change in the lattice volume of the main phase as compared with the substitution of a part of Fe with Ni.

The reason for the description of "basically" in the description regarding the coefficient of the "relational expression that represents the lattice volume of the main phase" so far will be described.

In Formula (1), the "relational expression that represents the lattice volume of the main phase" relates to the $Sm_2Fe_{17}N_3$ phase, and is acquired by using machine learning on the assumption that a part of Sm is substituted with La and/or Ce, and a part of Fe is substituted with Co and/or Ni. Actually, when the $Sm_2Fe_{17}$ phase is nitrided, in addition to the $Sm_2Fe_{17}N_3$ phase, an $Sm_2Fe_{17}N_h$ phase (where, h is 2.9 to 3.1) is obtained depending on a degree of nitriding. Details of h will be described below.

The coefficients of x, y, p, and q are changed depending on the degree of nitriding. As the absolute value of the coefficient is smaller, the coefficient is more likely to be affected by the degree of nitriding. For example, among the coefficients of x, y, p, and q, the absolute value of the coefficient of y is the smallest, and thus y is likely to be affected by the degree of nitriding. Specifically, when a part of Sm is substituted with Ce, the lattice volume of the main phase is basically increased. Therefore, the coefficient of y is basically positive. However, the coefficient of y may be decreased depending on the degree of nitriding. In that case, since the absolute value of the coefficient of y is small, the coefficient of y can be negative as the coefficient of y is decreased. The fact that the coefficient of y is negative means that the lattice volume of the main phase is decreased even when a part of Sm is substituted with Ce. The above is because the ionic radius of Ce is large as compared with the ionic radius of Sm, but the difference thereof is small, so that the absolute value of the coefficient of y is small. Further, the above is also because the Ce ions have trivalent and tetravalent values, and the coefficient of y is likely to be changed.

On the other hand, since the ionic radius of La is greatly large as compared with the ionic radius of Sm, the coefficient is less likely to be affected by the degree of nitriding. Specifically, when a part of Sm is substituted with La, the lattice volume of the main phase is basically increased. Therefore, the coefficient of x is basically positive. However, the coefficient of x may be decreased depending on the degree of nitriding. Even in that case, since the absolute value of the coefficient of x is relatively large, even when the coefficient of x is decreased, it is difficult for the coefficient of x to be negative. Examples of a case where the coefficient of x is decreased depending on the degree of nitriding until the coefficient of x is negative include a case where the amount of substitution with La is small.

In a case where a part of Fe is substituted with Co and/or Ni, the lattice volume of the main phase is basically decreased. Therefore, the coefficients of p and q are basically negative. However, the coefficients of p and q may be increased depending on the degree of nitriding. Even in that case, since the absolute values of the coefficients of p and q are large as compared with the absolute values of the coefficients of x and y, even when the coefficients of p and q are increased, it is difficult for the coefficients of p and q to be positive.

As described so far, in Formula (1), the "relational expression that represents the lattice volume of the main phase" has the technical significance as described above even when acquired by machine learning. It has been experimentally confirmed that the desired saturation magnetization can be obtained when the lattice volume of the main phase is within the range of 0.833 $nm^3$ to 0.840 $nm^3$. From the above, it is preferable that Formula (1) be satisfied for x, y, p, and q.

h

Next, h that indicates the degree of nitriding will be described. When the $Sm_2Fe_{17}$ phase is nitrided, the $Sm_2Fe_{17}N_h$ phase (where, h=3) is basically formed. Nitriding is typically performed by exposing an Sm—Fe—N-based magnetic material precursor (hereinafter, simply referred to as "precursor") having the $Sm_2Fe_{17}$ phase at a high temperature in a nitrogen gas atmosphere. Therefore, since the degree of nitriding differs between a surface and an inside of the precursor, h can fluctuate within the range of 2.9 to 3.1. The same applies to a case where a part of Sm is substituted with La and/or Ce and a part of Fe is substituted with Co and/or Ni in the precursor. That is, when the $(Sm, La, Ce)_2(Fe, Co, Ni)_{17}$ phase is nitrided, $(Sm, La, Ce)_2(Fe, Co, Ni)_{17}N_h$ phase (where, h is 2.9 to 3.1) is formed.

Volume Fraction of Main Phase

The Sm—Fe—N-based magnetic material according to the present disclosure includes the main phase represented by the composition formula described above. The magnetic characteristic of the Sm—Fe—N-based magnetic material according to the present disclosure is expressed by the main phase. Therefore, it is preferable that the volume fraction of the main phase to the entire Sm—Fe—N-based magnetic material according to the present disclosure be high. Specifically, the volume fraction of the main phase to the entire Sm—Fe—N-based magnetic material according to the present disclosure may be 95% or more, 96% or more, or 97% or more. On the other hand, when the Sm—Fe—N-based magnetic material according to the present disclosure is manufactured, there is a case where a step is present in which a phase other than the main phase represented by the composition formula described above is within a stable temperature region. Also, there is a case where it is difficult to eliminate the inclusion of the unavoidable impurity element that does not constitute the main phase. From the above, the volume fraction of the main phase is ideally 100%, but there is no problem in practical use even when the volume fraction of the main phase is 99% or less or 98% or less as long as the volume fraction of the main phase described above is secured.

The phase other than the main phase is typically present at grain boundaries between the main phases, particularly at a triple point. Examples of the phase other than the main phase include an $SmFe_3$ phase and a nitrided phase thereof. Examples of the $SmFe_3$ phase and the nitrided phase thereof include a phase in which a part of Sm is substituted with one or more elements selected from the group consisting of La, Ce, and $R^1$, and a nitrided phase thereof, a phase in which a part of Fe is substituted with one or more elements selected from the group consisting of Co, Ni, and M, and a nitrided phase thereof, and a phase in which a part of Sm is substituted with one or more elements selected from the group consisting of La, Ce, and $R^1$ and a part of Fe is substituted with one or more elements selected from the group consisting of Co, Ni, and M, and nitrided phases thereof.

The volume fraction of the main phase is obtained by measuring the entire composition of the precursor before nitriding by using inductively coupled plasma atomic emission spectroscopy (ICP-AES) to calculate the volume fraction of the main phase from the measured value on the assumption that the precursor before nitriding is divided into an $(Sm, La, Ce, R^1)_2(Fe, Co, Ni, M)_{17}$ phase and an $(Sm, La, Ce, R^1)(Fe, Co, Ni, M)_3$ phase. Specifically, after a mass concentration (mass ratio) of each element is obtained from the measurement result by the ICP, a mass ratio of $Sm_2Fe_{17}$ phase and $SmFe_3$ phase is first calculated, and the volume fraction is calculated from a density of each phase. Note that the $(Sm, La, Ce, R^1)_2(Fe, Co, Ni, M)_{17}$ phase represents the $Sm_2Fe_{17}$ phase, a phase in which a part of Sm in the $Sm_2Fe_{17}$ phase is substituted with one or more elements selected from the group consisting of Sm, La, Ce, and $R^1$, a phase in which a part of Fe in the $Sm_2Fe_{17}$ phase is substituted with one or more elements selected from the group consisting of Co, Ni, and M, and a phase in which a part of Sm in the $Sm_2Fe_{17}$ phase is substituted with one or more elements selected from the group consisting of Sm, La, Ce, and $R^1$ and a part of Fe in the $Sm_2Fe_{17}$ phase is substituted with one or more elements selected from the group consisting of Co, Ni, and M. Further, the $(Sm, La, Ce, R^1)(Fe, Co, Ni, M)_3$ phase represents the $SmFe_3$ phase, a phase in which a part of Sm in the $SmFe_3$ phase is substituted with one or more elements selected from the group consisting of Sm, La, Ce, and R', a phase in which a part of Fe in the $SmFe_3$ phase is substituted with one or more elements selected from the group consisting of Co, Ni, and M, and a phase in which a part of Sm in the $SmFe_3$ phase is substituted with one or more elements selected from the group consisting of Sm, La, Ce, and $R^1$ and a part of Fe in the $SmFe_3$ phase is substituted with one or more elements selected from the group consisting of Co, Ni, and M.

The entire composition (the sum of the main phase and the phase other than the main phase) of the Sm—Fe—N-based magnetic material according to the present disclosure can be set to be equal to or larger than the total number of moles of Sm, La, Ce, and $R^1$ of the main phase from the viewpoint of suppressing expression of an α-(Fe, Co, Ni, M) phase and a nitrided phase thereof during manufacturing of the Sm—Fe—N-based magnetic material according to the present disclosure. That is, the entire composition of the Sm—Fe—N-based magnetic material according to the present disclosure may be $(Sm_{(1-x-y-z)}La_xCe_yR^1{}_z)_w(Fe_{(1-p-q-s)}Co_pNi_qM_s)_{17}N_h$ (where, w is 2.00 to 3.00). In this case, x, y, z, p, q, s, and h may be the same as x, y, z, p, q, s, and h in the above-described formula that represents the composition of the main phase. From the viewpoint of suppressing the expression of the α-(Fe, Co, Ni, M) phase, w is preferably 2.02 or more, 2.04 or more, 2.06 or more, 2.08 or more, 2.10 or more, 2.20 or more, 2.30 or more, 2.40 or more, or 2.50 or more. On the other hand, from the viewpoint of decreasing the volume fraction of the $(Sm, La, Ce, R^1)(Fe, Co, Ni, M)_3$ phase described above, w is preferably 2.90 or less, 2.80 or less, 2.70 or less, or 2.60 or less.

Density of Main Phase

In the Sm—Fe—N-based magnetic material according to the present disclosure, the lattice volume of the main phase and the density of the main phase have a close relationship.

The density of the main phase may be 7.30 g/cm$^3$ or more, 7.35 g/cm$^3$ or more, 7.39 g/cm$^3$ or more, or 7.40 g/cm$^3$ or more, and may be 7.70 g/cm$^3$ or less, 7.65 g/cm$^3$ or less, or 7.60 g/cm$^3$ or less.

The density of the main phase is obtained by pulverizing the Sm—Fe—N-based magnetic material to obtain powder and measuring the density of the powder by a pycnometer method. As described above, in the Sm—Fe—N-based magnetic material according to the present disclosure, it is preferable that the volume fraction of the main phase be 95%. Further, the densities of the $Sm_2Fe_{17}N_3$ phase and the $SmFe_3$ phase are 7.65 g/cm$^3$ and 8.25 g/cm$^3$, respectively, and are not so different. From the above, the density of the main phase can be approximated by the value obtained by the measurement method described above.

Manufacturing Method

Next, a manufacturing method of the Sm—Fe—N-based magnetic material according to the present disclosure (hereinafter, may be referred to as the "manufacturing method according to the present disclosure") will be described.

The manufacturing method according to the present disclosure includes a magnetic material precursor preparation step and a nitriding step. Hereinafter, each step will be described.

Magnetic Material Precursor Preparation Step

In the manufacturing method of the Sm—Fe—N-based magnetic material according to the present disclosure, the magnetic material precursor including the crystal phase having the composition represented by the molar ratio formula $(Sm_{(1-x-y-z)}La_xCe_yR^1_z)_2(Fe_{(1-p-q-s)}Co_pNi_qM_s)_{17}$ is prepared.

In the formula that represents the composition of the crystal phase, Sm, La, Ce, R$^1$, Fe, Co, Ni, M, x, y, z, p, q, and s are as described in "Sm—Fe—N-Based Magnetic Material".

The crystal phase in the magnetic material precursor has at least any one of the $Th_2Zn_{17}$ type and $Th_2Ni_{17}$ type crystal structures. When the magnetic material precursor is nitrided, the crystal phase in the magnetic material precursor is nitrided to form the main phase in the Sm—Fe—N-based magnetic material according to the present disclosure. The main phase in Sm—Fe—N-based magnetic material according to the present disclosure has at least any one of the $Th_2Zn_{17}$ type and $Th_2Ni_{17}$ type crystal structures. From the above, nitriding is performed to the extent that at least any one of the $Th_2Zn_{17}$ type and $Th_2Ni_{17}$ type crystal structures is maintained.

As described above, since the crystal phase in the magnetic material precursor is nitrided to form the main phase in the Sm—Fe—N-based magnetic material according to the present disclosure, the volume fraction of the crystal phase in the magnetic material precursor may be considered to be equivalent to the volume fraction of the main phase in the Sm—Fe—N-based magnetic material according to the present disclosure. From the above, the volume fraction of the crystal phase in the magnetic material precursor may be 95% or more, 96% or more, or 97% or more with respect to the entire magnetic material precursor. When the magnetic material precursor is manufactured, there is a case where a step is present in which a phase other than the crystal phase represented by the composition formula described above is within a stable temperature region. In addition, there is a case where it is difficult to eliminate the inclusion of the unavoidable impurity element that does not constitute the crystal phase. The volume fraction of the crystal phase is ideally 100%, but there is no problem in practical use even when the volume fraction of the crystal phase is 99% or less or 98% or less as long as the volume fraction of the main phase described above is secured.

The phase other than the crystal phase is typically present at grain boundaries between the crystal phases, particularly at a triple point. Examples of the phase other than the crystal phase include an $SmFe_3$ phase. Examples of the $SmFe_3$ phase include a phase in which a part of Sm is substituted with one or more elements selected from the group consisting of La, Ce, and R$^1$, a phase in which a part of Fe is substituted with one or more elements selected from the group consisting of Co, Ni, and M, and a phase in which a part of Sm is substituted with one or more elements selected from the group consisting of La, Ce, and R$^1$ and a part of Fe is substituted with one or more elements selected from the group consisting of Co, Ni, and M.

The volume fraction of the crystal phase is obtained by measuring the entire composition of the precursor before nitriding by using inductively coupled plasma atomic emission spectroscopy (ICP-AES) to calculate a main phase ratio from the measured value on the assumption that the precursor before nitriding is divided into an $(Sm, La, Ce, R^1)_2(Fe, Co, Ni, M)_{17}$ phase and an $(Sm, La, Ce, R^1)(Fe, Co, Ni, M)_3$ phase. Specifically, after a mass concentration (mass ratio) of each element is obtained from the measurement result by the ICP, a mass ratio of $Sm_2Fe_{17}$ phase and $SmFe_3$ phase is first calculated, and the volume fraction is calculated from a density of each phase. Note that the $(Sm, La, Ce, R^1)_2(Fe, Co, Ni, M)_{17}$ phase represents the $Sm_2Fe_{17}$ phase, a phase in which a part of Sm in the $Sm_2Fe_{17}$ phase is substituted with one or more elements selected from the group consisting of Sm, La, Ce, and R$^1$, a phase in which a part of Fe in the $Sm_2Fe_{17}$ phase is substituted with one or more elements selected from the group consisting of Co, Ni, and M, and a phase in which a part of Sm in the $Sm_2Fe_{17}$ phase is substituted with one or more elements selected from the group consisting of Sm, La, Ce, and R$^1$ and a part of Fe in the $Sm_2Fe_{17}$ phase is substituted with one or more elements selected from the group consisting of Co, Ni, and M. Also, the $(Sm, La, Ce, R^1)(Fe, Co, Ni, M)_3$ phase represents the $SmFe_3$ phase, a phase in which a part of Sm in the $SmFe_3$ phase is substituted with one or more elements selected from the group consisting of Sm, La, Ce, and R$^1$, a phase in which a part of Fe in the $SmFe_3$ phase is substituted with one or more elements selected from the group consisting of Co, Ni, and M, and a phase in which a part of Sm in the $SmFe_3$ phase is substituted with one or more elements selected from the group consisting of Sm, La, Ce, and R$^1$ and a part of Fe in the $SmFe_3$ phase is substituted with one or more elements selected from the group consisting of Co, Ni, and M.

The entire composition (the sum of the crystal phase and the phase other than the crystal phase) of the magnetic material precursor can be set to be equal to or larger than the total number of moles of Sm, La, Ce, and R$^1$ of the crystal phase from the viewpoint of suppressing expression of the α-(Fe, Co, Ni, M) phase during manufacturing of the magnetic material precursor. That is, the entire composition of the magnetic material precursor may be $(Sm_{(1-x-y-z)}La_xCe_yR^1_z)_w(Fe_{(1-p-q-s)}Co_pNi_qM_s)_{17}$ (where, w is 2.00 to 3.00). In this case, x, y, z, p, q, and s may be the same as x, y, z, p, q, and s in the above-described formula that represents the composition of the crystal phase. From the viewpoint of suppressing the expression of the α-(Fe, Co, Ni, M) phase, w is preferably 2.02 or more, 2.04 or more, 2.06 or more, 2.08 or more, 2.10 or more, 2.20 or more, 2.30 or more, 2.40 or more, or 2.50 or more. On the other hand, from the viewpoint of decreasing the volume fraction of the (Sm, La, Ce, $R^1$)(Fe, Co, Ni, M)$_3$ phase, w is preferably 2.90 or less, 2.80 or less, 2.70 or less, or 2.60 or less.

The magnetic material precursor can be obtained by using a well-known manufacturing method. Examples of the method of obtaining the magnetic material precursor include a method of melting a raw material containing an element constituting the magnetic material precursor and solidifying the melted material. Examples of the method of melting the raw material include a method in which the raw material is charged into a container, such as a crucible, the raw material is arc-melted or high-frequency melted in the container to obtain a molten metal, and then the molten metal is injected into a mold, such as a book mold, or the molten metal is solidified in the crucible. From the viewpoints of suppressing coarsening of the crystal phase in the magnetic material precursor and enhancing homogenization of the crystal phase, it is preferable to increase a cooling rate of the molten metal. From these viewpoints, it is preferable to inject the molten metal into the mold, such as the book mold. Also, from the viewpoints of suppressing the coarsening of the crystal phase in the magnetic material precursor and enhancing the homogenization of the crystal phase, for example, the following method may be adopted. That is, an ingot obtained by high-frequency melting or arc-melting the raw material in the container and to solidify the melted material may be melted again by high-frequency melting or the like, the melt may be quenched by using a strip casting method, a liquid quenching method, and the like to obtain a flake, and the flake may be used as the magnetic material precursor.

Prior to nitriding to be described below, the magnetic material precursor may be subjected to heat treatment (hereinafter, such heat treatment may be referred to as "homogenization heat treatment") in order to homogenize crystal grains in the magnetic material precursor. A temperature of the homogenization heat treatment may be, for example, 1273 K or higher, 1323 K or higher, or 1373 K or higher, and may be 1523 K or lower, 1473 K or lower, or 1423 K or lower. The homogenization heat treatment time may be, for example, 6 hours or longer, 12 hours or longer, 18 hours or longer, or 24 hours or longer, and may be 48 hours or shorter, 42 hours or shorter, 36 hours or shorter, or 30 hours or shorter.

It is preferable that the homogenization heat treatment be performed in inert gas atmosphere in order to suppress oxidation of the magnetic material precursor. The nitrogen gas atmosphere is not included in the inert gas atmosphere. This is because when the homogenization heat treatment is performed in the nitrogen gas atmosphere, the phase having the $Th_2Zn_{17}$ type and/or $Th_2Ni_{17}$ type crystal structures is likely to be decomposed.

Nitriding Step

The magnetic material precursor described above is nitrided. As a result, the crystal phase in the magnetic material precursor is nitrided to form the main phase in the Sm—Fe—N-based magnetic material according to the present disclosure.

A nitriding method is not particularly limited as long as a desired main phase can be obtained, but typically, examples thereof include a method in which the magnetic material precursor is heated and exposed to an atmosphere containing nitrogen gas or exposed to a gas atmosphere containing nitrogen (N). Examples of the atmosphere containing nitrogen gas include the nitrogen gas atmosphere, a mixed gas atmosphere of nitrogen gas and inert gas, and a mixed gas atmosphere of nitrogen gas and hydrogen gas. Examples of the gas atmosphere containing nitrogen (N) include an ammonia gas atmosphere and a mixed gas atmosphere of ammonia gas and hydrogen gas. The atmospheres described so far as an example may be combined. From the viewpoint of nitriding efficiency, the ammonia gas atmosphere, the mixed gas atmosphere of ammonia gas and hydrogen gas, and the mixed gas atmosphere of nitrogen gas and hydrogen gas are preferable.

The magnetic material precursor may be pulverized to obtain magnetic material precursor powder before nitriding, and then the magnetic material precursor powder may be nitrided. By performing nitriding after pulverizing the magnetic material precursor, the crystal phase present inside the magnetic material precursor can be sufficiently nitrided. It is preferable that the magnetic material precursor be pulverized in the inert gas atmosphere. The nitrogen gas atmosphere may be included in the inert gas atmosphere. As a result, the oxidation of the magnetic material precursor during pulverization can be suppressed. A particle size of the magnetic material precursor powder may be, in terms of $D_{50}$, 5 μm or more, 10 μm or more, or 15 μm or more, and may be 50 μm or less, 40 μm or less, 30 μm or less, 25 μm or less, or 20 μm or less.

A nitriding temperature may be, for example, 673 K or higher, 698 K or higher, 723 K or higher, or 748 K or higher, and may be 823 K or lower, 798 K or lower, or 773 K or lower. Further, the nitriding time may be, for example, 4 hours or longer, 8 hours or longer, 12 hours or longer, or 16 hours or longer, and may be 48 hours or shorter, 36 hours or shorter, 24 hours or shorter, 20 hours or shorter, or 18 hours or shorter.

Modification

The Sm—Fe—N-based magnetic material and the manufacturing method thereof according to the present disclosure are not limited to the embodiments described so far, and may be appropriately modified within the scope described in the claims. For example, the Sm—Fe—N-based magnetic material according to the present disclosure may be powder or a molded body of the powder. The molded body may be the bond molded body or a sintered molded body. As the molded body, the bond molded body is preferable from the viewpoint of easily avoiding a temperature at which nitrogen (N) in the main phase is separated (decomposed) in a molding step. Examples of the bond include a resin and a low melting point metal bond. Examples of the low melting point metal bond include a zinc metal or a zinc alloy and a combination thereof.

Hereinafter, the Sm—Fe—N-based magnetic material and the manufacturing method thereof according to the present disclosure will be described in more detail with reference to Examples and Comparative Examples. Note that the Sm—Fe—N-based magnetic material and the manufacturing method thereof according to the present disclosure are not limited to the conditions used in Examples below.

Preparation of Sample

Samples of the Sm—Fe—N-based magnetic material were prepared as follows.

Metal Sm, metal La, a Ce—Fe alloy, metal Fe, metal Co, and metal Ni were mixed such that the main phase had a composition shown in Table 1, and the mixture was high-frequency melted at 1673 K (1400° C.) and solidified to obtain the magnetic material precursor. In the mixing, the total number of mixing moles of Sm, La, and Ce was larger than the total number of moles of Sm, La, and Ce in the main phase such that the volume fraction of the main phase was 95% to 100%. Note that in the present specification, for example, "metal Sm" means Sm that is not alloyed. It is needless to say that the metal Sm may contain the unavoidable impurity.

The magnetic material precursor was subjected to the homogenization heat treatment in an argon gas atmosphere at 1373 K for 24 hours.

The magnetic material precursor after the homogenization heat treatment was charged into a glove box, and the magnetic material precursor was pulverized by using a cutter mill in the nitrogen gas atmosphere. The particle size of the magnetic material precursor powder after the pulverization was 20 μm or less in terms of $D_{50}$.

The magnetic material precursor powder was heated to 748 K and nitrided for 16 hours in the nitrogen gas atmosphere. An amount of nitriding was grasped by a mass change of the magnetic material precursor powder before and after nitriding.

Evaluation

For each sample, the composition, the volume fraction, the density, and the lattice volume of the main phase were obtained by the measurement method described above. Further, for each sample, the magnetic characteristic was measured by applying a maximum magnetic field of 9 T by using a physical property measurement system PPMS (registered trademark)-VSM. As for the measurement of the magnetic characteristic, each sample powder after nitriding was solidified while being magnetically oriented in an epoxy resin, and the magnetic characteristic of each sample after solidification was measured at 300 K to 453 K in an easy-magnetization axis direction and a hard-magnetization axis direction. Saturation magnetization Ms was calculated from the measured values in the easy-magnetization axis direction by using law of approach to saturation. Further, an anisotropic magnetic field Ha was obtained from an intersection of a hysteresis curve in the easy-magnetization axis direction and a hysteresis curve in the hard-magnetization axis direction.

Figure 2:
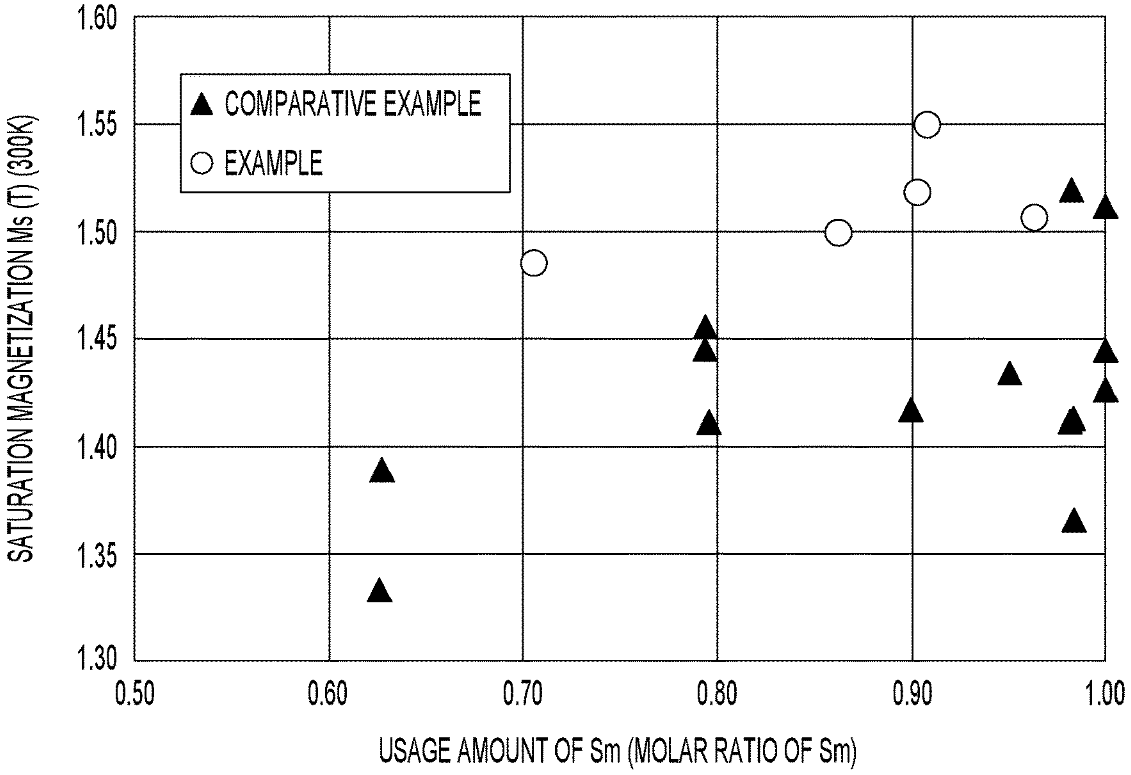
FIG. 2 is a graph showing a relationship between a usage amount of Sm (molar ratio of Sm) and the saturation magnetization Ms (300 K)
Figure 3:
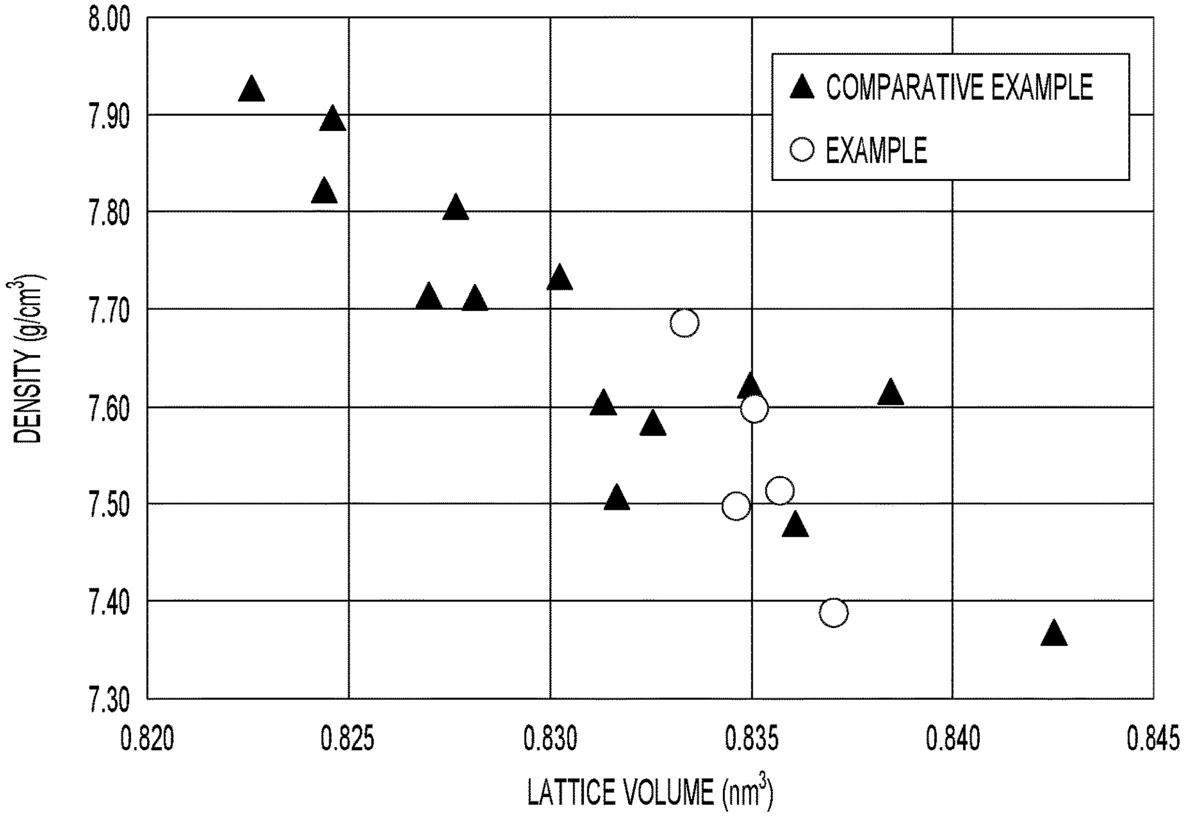
FIG. 3 is a graph showing a relationship between the lattice volume and a density.

The results are shown in Table 1. FIG. 1 is a graph showing a relationship between the lattice volume and the saturation magnetization Ms (300 K). FIG. 2 is a graph showing a relationship between the usage amount of Sm (molar ratio of Sm) and the saturation magnetization Ms (300 K). FIG. 3 is a graph showing a relationship between the lattice volume and the density.

TABLE 1

| | Composition of main phase (target) | Molar ratio of rare earth site: Sm (1 − x − y) | La (x) | Ce (y) | La + Ce (x + y) | Molar ratio of iron group site: Fe (1 − p − q) | Co (p) | Ni (q) | Co + Ni (p + q) | Content of each element in main phase (% by atom): Sm | La | Ce | Fe | Co | Ni | N | The number of nitriding moles |
|---|---|---|---|---|---|---|---|---|---|---|---|---|---|---|---|---|---|
| Comparative Example 1 | $Sm_2Fe_{17}N_3$ | 1.00 | 0.00 | 0.00 | 0.00 | 1.00 | 0.00 | 0.00 | 0.00 | 9.09 | 0.00 | 0.00 | 77.27 | 0.00 | 0.00 | 13.6 | 3.0 |
| Comparative Example 2 | $Sm_2(Fe_{0.85}Co_{0.15})_{17}N_3$ | 1.00 | 0.00 | 0.00 | 0.00 | 0.85 | 0.15 | 0.00 | 0.15 | 9.09 | 0.00 | 0.00 | 65.85 | 11.42 | 0.00 | 13.6 | 2.9 |
| Comparative Example 3 | $Sm_2(Fe_{0.7}Co_{0.3})_{17}N_3$ | 1.00 | 0.00 | 0.00 | 0.00 | 0.70 | 0.30 | 0.00 | 0.30 | 9.09 | 0.00 | 0.00 | 54.26 | 23.01 | 0.00 | 13.6 | 2.8 |
| Comparative Example 4 | $(Sm_{0.9}La_{0.1})_2(Fe_{0.7}Co_{0.3})_{17}N_3$ | 0.90 | 0.10 | 0.00 | 0.10 | 0.70 | 0.30 | 0.00 | 0.30 | 8.18 | 0.91 | 0.00 | 54.10 | 23.17 | 0.00 | 13.6 | 2.9 |
| Comparative Example 5 | $(Sm_{0.79}La_{0.21})_{12}Fe_{17}N_3$ | 0.79 | 0.21 | 0.00 | 0.21 | 1.00 | 0.00 | 0.00 | 0.00 | 7.21 | 1.88 | 0.00 | 77.27 | 0.00 | 0.00 | 13.6 | 3.0 |
| Comparative Example 6 | $(Sm_{0.79}La_{0.21})_{12}Fe_{0.85}Co_{0.15})_{17}N_3$ | 0.79 | 0.21 | 0.00 | 0.21 | 0.85 | 0.15 | 0.00 | 0.15 | 7.22 | 1.87 | 0.00 | 65.55 | 11.72 | 0.00 | 13.6 | 3.0 |
| Comparative Example 7 | $(Sm_{0.8}La_{0.2})_2(Fe_{0.7}Co_{0.3})_{17}N_3$ | 0.80 | 0.20 | 0.00 | 0.20 | 0.70 | 0.30 | 0.00 | 0.30 | 7.23 | 1.86 | 0.00 | 54.21 | 23.06 | 0.00 | 13.6 | 2.9 |
| Comparative Example 8 | $(Sm_{0.95}La_{0.05})_2(Fe_{0.8}Co_{0.2})_{17}N_3$ | 0.95 | 0.05 | 0.00 | 0.05 | 0.80 | 0.20 | 0.00 | 0.20 | 8.64 | 0.45 | 0.00 | 61.77 | 15.50 | 0.00 | 13.6 | 2.9 |
| Comparative Example 9 | $(Sm_{0.98}La_{0.02})_2Fe_{17}N_3$ | 0.98 | 0.02 | 0.00 | 0.02 | 1.00 | 0.00 | 0.00 | 0.00 | 8.93 | 0.16 | 0.00 | 77.27 | 0.00 | 0.00 | 13.6 | 3.2 |
| Comparative Example 10 | $(Sm_{0.98}Ce_{0.02})_2(Fe_{0.9}Ni_{0.1})_{17}N_3$ | 0.98 | 0.00 | 0.02 | 0.02 | 0.90 | 0.00 | 0.10 | 0.10 | 8.93 | 0.00 | 0.16 | 69.45 | 0.00 | 7.82 | 13.6 | 3.0 |
| Comparative Example 11 | $(Sm_{0.98}Ce_{0.02})_2(Fe_{0.64}Co_{0.26}Ni_{0.1})_{17}N_3$ | 0.98 | 0.00 | 0.02 | 0.02 | 0.64 | 0.26 | 0.10 | 0.35 | 8.94 | 0.00 | 0.15 | 49.45 | 19.77 | 7.52 | 13.6 | 3.0 |
| Comparative Example 12 | $(Sm_{0.98}Ce_{0.02})_2(Fe_{0.69}Co_{0.25}Ni_{0.06})_{17}N_3$ | 0.98 | 0.00 | 0.02 | 0.02 | 0.69 | 0.25 | 0.06 | 0.31 | 8.94 | 0.00 | 0.15 | 53.21 | 19.56 | 4.49 | 13.6 | 3.0 |
| Comparative Example 13 | $(Sm_{0.61}La_{0.19}Ce_{0.2})_2(Fe_{0.61}Co_{0.3}$-$Ni_{0.09})_{17}N_3$ | 0.63 | 0.19 | 0.18 | 0.37 | 0.60 | 0.30 | 0.09 | 0.40 | 5.69 | 1.73 | 1.68 | 46.72 | 23.35 | 7.20 | 13.6 | 3.1 |
| Comparative Example 14 | $(Sm_{0.61}La_{0.19}Ce_{0.2})_2(Fe_{0.65}Co_{0.3}$-$Ni_{0.05})_{17}N_3$ | 0.63 | 0.19 | 0.18 | 0.37 | 0.65 | 0.30 | 0.05 | 0.35 | 5.70 | 1.72 | 1.67 | 50.53 | 22.81 | 3.94 | 13.6 | 3.1 |
| Example 1 | $(Sm_{0.7}La_{0.1}Ce_{0.2})_2(Fe_{0.92}Co_{0.05}$-$Ni_{0.02})_{17}N_3$ | 0.71 | 0.11 | 0.19 | 0.29 | 0.93 | 0.05 | 0.02 | 0.07 | 6.42 | 0.97 | 1.70 | 71.78 | 3.89 | 1.60 | 13.6 | 3.1 |
| Example 2 | $(Sm_{0.91}La_{0.09})_2(Fe_{0.91}Co_{0.09})_{17}N_3$ | 0.91 | 0.09 | 0.00 | 0.09 | 0.91 | 0.09 | 0.00 | 0.09 | 8.25 | 0.84 | 0.00 | 70.47 | 6.80 | 0.00 | 13.6 | 3.1 |
| Example 3 | $(Sm_{0.9}Ce_{0.1})_2(Fe_{1.0})_{17}N_3$ | 0.90 | 0.00 | 0.10 | 0.10 | 1.00 | 0.00 | 0.00 | 0.00 | 8.21 | 0.00 | 0.88 | 77.27 | 0.00 | 0.00 | 13.6 | 3.2 |
| Example 4 | $(Sm_{0.85}Ce_{0.1}La_{0.05})_2(Fe_{1.0})_{17}N_3$ | 0.86 | 0.04 | 0.09 | 0.14 | 1.00 | 0.00 | 0.00 | 0.00 | 7.84 | 0.39 | 0.86 | 77.27 | 0.00 | 0.00 | 13.6 | 3.1 |
| Example 5 | $(Sm_{0.96}Ce_{0.04})_2(Fe_{0.98}Ni_{0.02})_{17}N_3$ | 0.96 | 0.00 | 0.04 | 0.04 | 0.98 | 0.00 | 0.02 | 0.02 | 8.76 | 0.00 | 0.34 | 75.77 | 0.00 | 1.50 | 13.6 | 3.1 |

TABLE 1-continued

| | Machine learning | Main | Crystal structure of main phase | | | | | Magnetic characteristic | | | | |
|---|---|---|---|---|---|---|---|---|---|---|---|---|
| | | | | | | | | 300K | | 453K | | |
| | lattice volume (reference) ($nm^3$) | phase ratio (% by volume) | a-Axis length (nm) | c-Axis length (mn) | Lattice volume ($nm^3$) | (a-Axis length)/(c-Axis length) | Density ($g/cm^3$) | Saturation magnet-ization Ms (T) | Anisotropic magnetic field Ha (T) | Saturation magnet-ization Ms (T) | Anisotropic magnetic field Ha (T) | (Reference) Ms (300K/(Sm + Co) |
| Comparative Example 1 | 0.836 | 95.2 | 0.8742 | 1.2668 | 0.8385 | 1.4491 | 7.62 | 1.51 | 15.96 | 1.38 | 10.05 | 1.51 |
| Comparative Example 2 | 0.832 | 94.6 | 0.8718 | 1.2647 | 0.8325 | 1.4506 | 7.58 | 1.44 | 15.71 | 1.35 | 11.06 | 1.26 |
| Comparative Example 3 | 0.828 | 95.0 | 0.8699 | 1.2630 | 0.8277 | 1.4519 | 7.80 | 1.43 | 16.96 | 1.34 | 11.56 | 1.10 |
| Comparative Example 4 | 0.830 | 95.2 | 0.8705 | 1.2618 | 0.8281 | 1.4495 | 7.71 | 1.42 | 16.84 | 1.32 | 10.81 | 1.18 |
| Comparative Example 5 | 0.839 | 96.2 | 0.8762 | 1.2673 | 0.8425 | 1.4465 | 7.37 | 1.45 | 14.45 | 1.31 | 7.99 | 1.82 |
| Comparative Example 6 | 0.835 | 96.2 | 0.8738 | 1.2644 | 0.8361 | 1.4470 | 7.48 | 1.46 | 15.33 | 1.35 | 9.68 | 1.54 |
| Comparative Example 7 | 0.831 | 94.4 | 0.8720 | 1.2625 | 0.8313 | 1.4479 | 7.60 | 1.41 | 16.46 | 1.32 | 10.81 | 1.29 |
| Comparative Example 8 | 0.832 | 96.1 | 0.8716 | 1.2640 | 0.8317 | 1.4502 | 7.51 | 1.43 | 17.34 | 1.33 | 11.06 | 1.25 |
| Comparative Example 9 | 0.836 | 97.4 | 0.8733 | 1.2641 | 0.8350 | 1.4475 | 7.62 | 1.52 | 16.59 | 1.39 | 9.68 | 1.55 |
| Comparative Example 10 | 0.830 | 95.6 | 0.8713 | 1.2627 | 0.8302 | 1.4492 | 7.73 | 1.41 | 18.10 | 1.27 | 10.05 | 1.44 |
| Comparative Example 11 | 0.824 | 98.1 | 0.8684 | 1.2594 | 0.8226 | 1.4502 | 7.93 | 1.37 | 16.84 | 1.26 | 10.43 | 1.10 |
| Comparative Example 12 | 0.826 | 97.7 | 0.8691 | 1.2606 | 0.8246 | 1.4504 | 7.90 | 1.41 | 17.84 | 1.31 | 10.93 | 1.14 |
| Comparative Example 13 | 0.827 | 96.0 | 0.8696 | 1.2588 | 0.8244 | 1.4475 | 7.82 | 1.33 | 13.07 | 1.23 | 8.17 | 1.44 |
| Comparative Example 14 | 0.829 | 97.2 | 0.8704 | 1.2604 | 0.8270 | 1.4481 | 7.71 | 1.39 | 13.07 | 1.29 | 7.92 | 1.51 |
| Example 1 | 0.836 | 94.3 | 0.8734 | 1.2649 | 0.8357 | 1.4482 | 7.51 | 1.49 | 14.20 | 1.36 | 8.55 | 1.96 |
| Example 2 | 0.835 | 96.8 | 0.8725 | 1.2640 | 0.8333 | 1.4487 | 7.69 | 1.55 | 16.96 | 1.44 | 10.18 | 1.56 |
| Example 3 | 0.836 | 95.5 | 0.8731 | 1.2643 | 0.8346 | 1.4481 | 7.50 | 1.52 | 14.58 | 1.37 | 9.05 | 1.68 |
| Example 4 | 0.837 | 96.7 | 0.8740 | 1.2653 | 0.8371 | 1.4476 | 7.39 | 1.50 | 14.95 | 1.37 | 9.17 | 1.74 |
| Example 5 | 0.835 | 97.6 | 0.8733 | 1.2645 | 0.8351 | 1.4480 | 7.60 | 1.51 | 16.08 | 1.37 | 9.68 | 1.56 |

From Table 1 and FIG. 3, it can be understood that the lattice volume and the density have a close relationship. Then, from Table 1 and FIG. 1, it can be understood that, as compared with the sample of Comparative Example 1 including the $Sm_2Fe_{17}N_3$ phase as the main phase, in the samples of Examples 1 to 5 including the main phase having the lattice volume of 0.833 $nm^3$ to 0.840 $nm^3$, regardless of reduction of the usage amount of Sm, the saturation magnetization is improved or the decrease in the saturation magnetization is suppressed within the range in which there is no problem in practical use. Note that in Table 1 and FIG. 1, the samples of Comparative Examples 1, 6, and 9 have the lattice volumes of 0.833 $nm^3$ to 0.840 $nm^3$, but in the sample of Comparative Example 1, a part of Sm is not substituted with La and/or Ce ($0.04 \le x+y \le 0.50$ is not satisfied and the usage amount of Sm is not reduced), in the sample of Comparative Example 6, although a part of Fe is substituted with Co, the amount of substitution with Co is excessive, so that the economic efficiency of substituting a part of Sm with La is offset ($0 \le p+q \le 0.10$ is not satisfied), and in the sample of Comparative Example 9, although a part of Sm is substituted with La, the amount of substitution with La is too small ($0.04 \le x+y \le 0.50$ is not satisfied).

Further, from Table 1 and FIG. 2, it can be understood that in the samples of Comparative Examples (the lattice volume is outside 0.833 $nm^3$ to 0.840 $nm^3$), as the usage amount of Sm is reduced (the molar ratio of Sm becomes lower), the saturation magnetization Ms (300 K) tends to be decreased. On the other hand, it can be understood that in the samples of Examples 1 to 5 (the lattice volume is within 0.833 $nm^3$ to 0.840 $nm^3$), regardless of reduction of the usage amount of Sm, the saturation magnetization Ms (300 K) is equal to or more than a predetermined value.

From these results, the effects of the Sm—Fe—N-based magnetic material and the manufacturing method thereof according to the present disclosure can be confirmed.

What is claimed is:

1. An Sm—Fe—N-based magnetic material comprising a main phase having at least any one of $Th_2Zn_{17}$ type and $Th_2Ni_{17}$ type crystal structures, wherein:

the main phase has a composition represented by a molar ratio formula $(Sm_{(1-x-y-z)}La_xCe_yR^1{}_z)_2(Fe_{(1-p-q-s)}Co_pNi_qM_s)_{17}N_h$, where, $R^1$ is one or more rare earth elements other than Sm, La, and Ce, and Zr, M is one or more elements other than Fe, Co, Ni, and a rare earth element, and an unavoidable impurity element, and $0.08 \le x+y \le 0.50$, $0 \le z \le 0.02$, $0 \le p+q \le 0.10$, $0 \le s \le 0.10$, and $2.9 \le h \le 3.1$ are satisfied;

a crystal lattice volume of the main phase is 0.833 $nm^3$ to 0.838 $nm^3$; and a density of the main phase is 7.30 $g/cm^3$ to 7.70 $g/cm^3$.

2. The Sm—Fe—N-based magnetic material according to claim 1, wherein a volume fraction of the main phase is 95% to 100%.

3. The Sm—Fe—N-based magnetic material according to claim 1, wherein a density of the main phase is 7.40 $g/cm^3$ to 7.60 $g/cm^3$.

4. The Sm—Fe—N-based magnetic material according to claim 1 wherein M is one or more elements selected from the group consisting of chromium, manganese, vanadium, molybdenum, tungsten, and carbon.

5. The Sm—Fe—N-based magnetic material according to claim 1, wherein a crystal lattice volume of the main phase is 0.833 $nm^3$ to 0.8371 $nm^3$.

6. A manufacturing method of the Sm—Fe—N-based magnetic material according to claim 1, the method comprising:

preparing a magnetic material precursor including a crystal phase having a composition represented by a molar ratio formula $(Sm_{(1-x-y-z)}La_xCe_yR^1{}_z)_2(Fe_{(1-p-q-s)}Co_pNi_qM_s)_{17}$ (where, $R^1$ is one or more rare earth elements other than Sm, La, and Ce, and Zr, M is one or more elements other than Fe, Co, Ni, and a rare earth element, and an unavoidable impurity element, and $0.08 \le x+y \le 0.50$, $0 \le z \le 0.02$, $0 \le p+q \le 0.10$, and $0 \le s \le 0.10$ are satisfied); and nitriding the magnetic material precursor.

7. The method according to claim 6, wherein a volume fraction of the crystal phase is 95% to 100%.

8. The method according to claim 6, wherein the magnetic material precursor is pulverized to obtain magnetic material precursor powder, and then the magnetic material precursor powder is nitrided.

9. The method according to claim 6, wherein a raw material containing the elements constituting the magnetic material precursor is melted and solidified to obtain the magnetic material precursor.

* * * * *